United States Patent [19]

Heckel et al.

[11] Patent Number: 5,049,431
[45] Date of Patent: Sep. 17, 1991

[54] MULTI-COLORED FLOOR COVERING AND METHOD OF MANUFACTURING IT

[75] Inventors: Klaus Heckel, Weinheim; Gerhard Graab, Mannheim; Hans-Michael Kuhl, Heimsbach, all of Fed. Rep. of Germany

[73] Assignee: Firma Carl Freudenberg, Weinheim/Bergstr., Fed. Rep. of Germany

[21] Appl. No.: 945,193

[22] Filed: Dec. 22, 1986

Related U.S. Application Data

[63] Continuation of Ser. No. 499,925, Jun. 1, 1983, abandoned.

[30] Foreign Application Priority Data

Sep. 9, 1982 [DE] Fed. Rep. of Germany ....... 3233448

[51] Int. Cl.⁵ .............. B32B 31/18; B32B 31/20
[52] U.S. Cl. .................... 156/252; 156/256; 428/138
[58] Field of Search .............. 428/137, 138, 212; 156/252, 256

[56] References Cited

U.S. PATENT DOCUMENTS

| | | | |
|---|---|---|---|
| 1,206,346 | 11/1916 | McTernen | 428/78 |
| 1,861,663 | 6/1932 | Lahey | 428/137 |
| 2,071,921 | 2/1937 | Dickson | 156/252 X |
| 2,244,557 | 6/1941 | Iknayan | 264/264 |
| 4,101,689 | 7/1978 | Wienand et al. | 427/122 |

FOREIGN PATENT DOCUMENTS

| | | | |
|---|---|---|---|
| 3046369 | 8/1976 | Japan . | |
| 0305694 | 2/1929 | United Kingdom | 156/252 |
| 0635091 | 4/1950 | United Kingdom | 156/252 |
| 851053 | 10/1960 | United Kingdom | 428/137 |
| 1125973 | 5/1968 | United Kingdom | 428/137 |

Primary Examiner—Alexander S. Thomas
Attorney, Agent, or Firm—Felfe & Lynch

[57] ABSTRACT

A method of manufacturing a floor covering presses a bottom layer of a polymeric material into apertures in a top layer having a higher pressure-flow viscosity than the bottom layer. The pressure also joins the layers into the floor covering and forms a continuous pressure-vulcanization skin on the top thereof for more uniform soiling and wear characteristics. Selecting the size and arrangement of the apertures in the top layer produces a corresponding pattern of the bottom-layer material in the top of the joined layers which is independent of any surface configuration also imparted in the pressing.

8 Claims, 1 Drawing Sheet

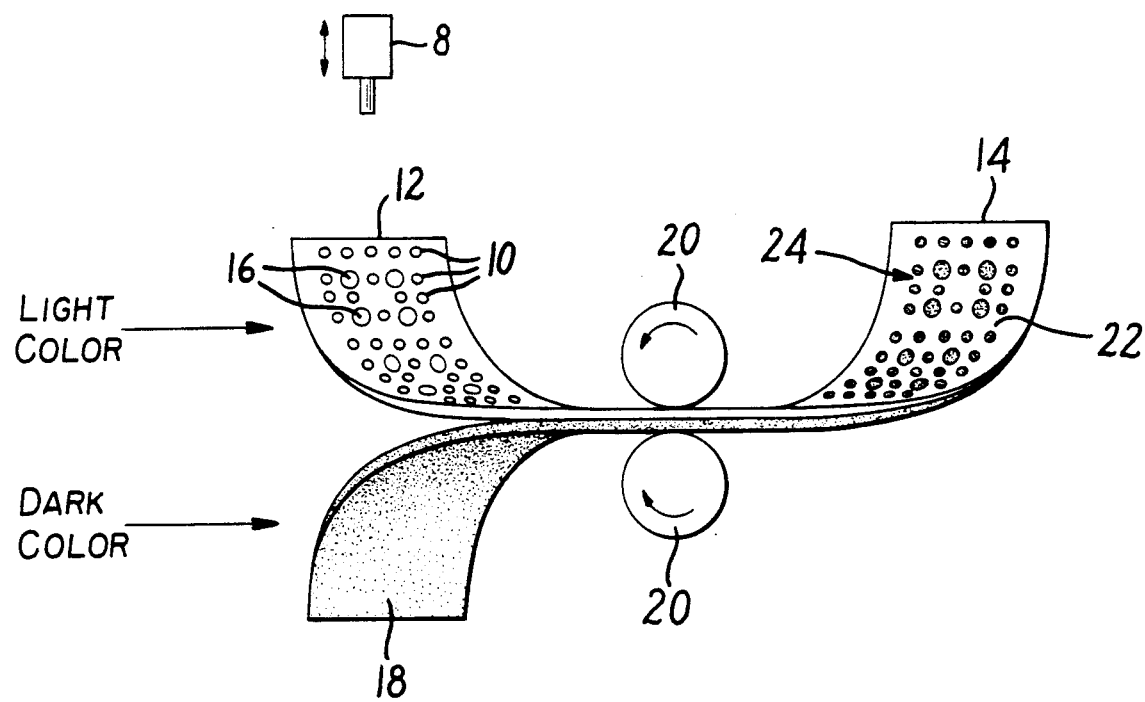

MULTI-COLORED FLOOR COVERING AND METHOD OF MANUFACTURING IT

This application is a continuation of application Ser. No. 499,925, filed June 1, 1983, abandoned.

BACKGROUND OF THE INVENTION

The invention relates to a floor covering and a method of manufacturing it in which, more particularly, a continuous bottom layer of a polymeric material penetrates apertures distributed in a top layer.

German patent application DOS 21 03 262 shows a top layer, initially continuous, laid on a bottom layer and pressed together into depressions in the press platens. This produces elevations on the top layer surface of the floor covering. These make it possible to remove the top layer completely by selective machining, thus exposing the bottom layer, which is of a contrasting color. More extensive machining results in a two-color surface that is free of elevations, but has traces of the machining where the original elevations were removed. In those spots, the floor covering is more vulnerable to soiling than elsewhere.

In an embodiment wherein the top layer and the bottom layer are made of a polymeric material such as rubber, the surface areas which have not been machined will, in contrast to the machined areas, have a so-called press or vulcanization skin, and hence a different abrasion resistance, too. Wear then results in the formation of undesirable unevenness.

The coloring and any relief-like texturing of the surface of a floor covering of this type also fully coincide with each other as a result of the manufacturing technique. This is not altogether satisfactory since architectural considerations often call for these to be independent of each other, as, for example, when the surface of the floor covering is to be given a predetermined color pattern for use as an advertising medium, without detracting from its antislip or wear-resisting relief.

SUMMARY OF THE INVENTION

The object of the invention thus is to improve a method of the type outlined in such a way that the drawbacks mentioned are avoided. The method should, in particular, be economical, permit the relief-like and colored designs on the surface to be selected independently of each other, and produce a continuous press or vulcanization skin on the surface for uniform wear and soiling properties.

In accordance with the invention, at least top and bottom layers are produced in a first step. The bottom layer is made in every case of a polymeric material which under the conditions of pressing is plastically deformable, for example, of uncrosslinked rubber or plastic. Its thickness is at least equal to that of the top layer. Preferably, however, its thickness is greater, to provide additional, general stiffening, and may be from two to three times that of the top layer.

The latter may consist of any desired material which by its nature is capable of forming a firm bond with the material of the bottom layer. For example, the top layer may be made of metal, wood, a fabric, or an uncrosslinked rubber or plastic. All else that is necessary is to make certain that its flow viscosity under pressure softening is greater than that of the simultaneously softening material of the bottom layer. In this way, good definition of the differently colored areas is obtained.

The flow viscosity here involved is referred to as Mooney viscosity in the case of rubber-elastic materials.

Proper coordination of the flow viscosities can be achieved by selection of appropriately different materials for the bottom and top layers for example, the bottom layer may be made of a rubber-elastic material and the top layer of a thermoplastic material. Particularly well suited are polyester and polyamide, which may be used both in sheet form and as woven, nonwoven, or knitted fabrics. Moreover, if sufficiently stable adhesion cannot be secured it can be improved by interposing a layer of an adhesion. promoter, for example, a polyurethane adhesive, a polychloroprene adhesive, a resorcinol-formaldehyde latex or a chlorinated-rubber solution. In the case of open-meshed layers, such as a fabric or a nonwoven, such a layer will at the same time prevent the rubber-elastic material, which softens during vulcanization, from penetrating into the pores of the top layer.

When the bottom and top layers are to be made from materials of a similar nature, for example, a rubber-elastic material, an increase in the flow viscosity of the top layer under the conditions of pressing may be obtained by admixing with it a relatively high proportion of a mineral filler. Similarly, the flow viscosity of the lower layer can be reduced by the use of or by admixing a copolymeric material having a particularly low viscosity, or by the use of a vulcanizing agent of a different nature.

It is also possible to produce the top and bottom layers from identical rubber-elastic materials if the top layer is prevulcanized and thus prevented from synchronous softening while it is being united with the bottom layer under pressure.

Apertures in the top layer in the form of perforations are produced by any desired technique, for example, by punching, cutting or drilling. With a view to achieving good definition of the contours of the colored pattern, great care must be taken to remove burrs and other loose material which is produced in such machining. In addition, it is advisable to place the top layer on the bottom layer in such a way that the side which had the burrs faces the bottom layer. Residual burrs which have been overlooked then are farther removed from the actual wearing surface and thus are not directly visible in the finished floor covering.

The boundaries of the apertures are perpendicular to the surfaces of the top layer to prevent a change in overall impression of the color pattern after wear has set in. Their shape can be selected at will and may be of any desired configuration so long as it does not detract from the intrinsic strength of the top layer. However, in addition to circular and polygonal outlines, pictograms, which may be of an advertising or indicational nature, are preferably used. By their use, the various departments of a department store, for example, or paths and traffic areas can be identified in a durable and easily understandable manner.

The apertures are associated with one another in mosaic fashion and, taken together, may also depict pictograms, letters, numbers, continuous lines and/or graphic representations serving to inform or to enlighten. The individual aperture is of small size, preferably between 1 and 5 mm across, and is associated with the adjacent apertures at a comparably close spacing. As a rule, resolution of the pattern so formed thus is not possible from a normal viewing distance and with the naked eye. On the other hand, the pattern has an extraordinarily brilliant appearance, which esthetically is a great advantage.

The higher the degree to which the bottom layer is uncovered, based on the total area of the apertures, the more the color of the bottom layer which is visible in the apertures will predominate. It is therefore advantageous, especially in pictorial displays, to use uniformly spaced apertures of a size which varies gradually and/or abruptly, or, if of uniform size, spacings which vary gradually and/or abruptly. This purpose will be served also by abrupt and/or gradual variations in the configuration of the apertures, for example, imperceptible transition from a square form of the aperture to an elongated rectangular form. As a result, the basically two-colored picture presented by the surface of the floor covering will be enhanced by light and shadow effects.

Because of the small size of the apertures, the top layer possesses good stability, which greatly facilitates distortion-free handling during processing. Even with large-size displays, it is not likely that handling during the placing of the various layers in the press die and/or flow of the bottom-layer material occurring during the pressing operation will result in changes that would detract from the overall impression of the surface of the finished floor covering. The designs represented by the surface areas may therefore have any desired form and shape, cover any desired portion of the area of the floor covering, and be arranged in individual segments, for example, of a frieze, at any desired point.

Greater latitude for variation of the color pattern is obtained when before the pressing operation differently colored particles of a polymeric material of a similar nature are introduced into the bottom layer or the top layer, which may be done simply by sprinkling them onto and calendering them into the surface. In the process, the particles will be deformed so that a perfectly smooth surface is obtained in which adjacent surface areas pass homogeneously into one another. In this way, considerable influence can be exerted on the overall color impression.

The top and bottom layers are then placed one on top of the other and pressed together in a forming die so that the bottom layer completely fills the apertures in the top layer. The temperature is controlled in such a way that the desired reciprocal bonding and compacting of the materials of the two layers is secured.

This means that when thermoplastically deformable materials are used to produce the two layers, an initial heating phase may be followed by a cooling phase, whereas when vulcanizable materials are used, simple heating to vulcanizing temperature will generally suffice. The latter may vary widely, depending on the material used in a given case, and preferably ranges from 150° to 190° C. Continuous operation with a rotary press is also possible.

The platens of the forming die which are vertically pressed against each other may be of smooth and plane construction, which will result in a floor covering with top and bottom surfaces perfectly smooth and plane. Such floor coverings are distinguished by particularly high resistance to mechanical loads.

By using an upper press platen having a relief-like texture, the antislip properties of the floor covering produced may be improved, which is frequently desirably or necessary, for example, when it is to be placed in a wet area.

The effectiveness of the keying after placement can be improved by texturing the bottom side in the same way. When the relief so formed consists of a plurality of closely spaced columns, an improvement in underfoot resilience and footfall absorption is further obtained with a bottom layer made of a rubber-elastic material.

DESCRIPTION OF THE DRAWINGS AND EXEMPLARY EMBODIMENTS

Preferred examples of the method which illustrate but do not limit the invention will now be described with reference to the drawing.

In the drawing, a punch 8 has punched generally uniformly distributed small round apertures 10 through a top layer 12 of a floor covering 14. Larger apertures 16 are similarly distributed in a longitudinally-repeating square pattern along the middle of the top layer.

The top layer 12, here illustrated as having a light color, is superimposed on an unapertured bottom layer 18, here illustrated as having a dark color. The bottom layer 18 has a lower pressure-flow viscosity than the top layer 10, the layers being made, for example, respectively of compositions A and I described below.

The superimposed top and bottom layers 10, 18 are then passed between heated pressure rollers of a roller press or belt calendar. Either or both rollers may be smooth or textured to relieve the contacted layer correspondingly. The heat and pressure bonds the layers together and flows the less viscous bottom layer fillingly into the apertures of the top layer. It also forms a continuous press-vulcanized skin on the top 22 of the floor covering 14. The greater amount of the dark bottom layer filling the larger apertures 16 forms a corresponding longitudinally-repeating square pattern 24 in the continuous press-vulcanized skin.

EXAMPLE 1

A rubber mixture consisting of formulation A is homogenized in a interval mixer. The mixture is then fed to a calender and calendered to a sheet having a thickness of between 0.5 and 1 mm. The sheet is wound into a coil and then transferred to a belt calender where it is prevulcanized at a surface temperature of 180° C. and a running speed of 80 meters/hour, which corresponds to a residence time of about 3 minutes. The sheet is then slit into two webs of equal width and wound up separately.

The components of formulation I are introduced into the interval mixer and after complete homogenization of the mixture calendered to a sheet of a thickness between 1.5 and 2 mm.

One of the two sheets of composition A is provided in a roller punch press with apertures which penetrate it completely. These are cylindrically limited and arranged on straight lines. Uniformly spaced 2 mm apart, they have a diameter of 1.8 mm. The lines comprise a first set of lines formed of parallel continuous lines and a second set of lines which intersects the first set of lines at right angles. The lines are spaced 50 mm apart. The apertures as a whole form a mosaic resembling a tile pattern.

The sheet forms the top layer, for the purposes of the proposed method. Its intrinsic strength is such that it can be handled without any danger of the pattern formed by the apertures being damaged or distorted.

The three sheets at hand are then stacked in such a way that the sheet of composition I is located between the two other sheets of composition A and are then transferred to a heated belt calender. The sheet provided with the perforations faces the polished calender roll. The latter has a surface temperature of 180° C. and a running speed of 36 meters/hour, which corresponds to a residence time of the three-layer composite of 6 minutes. During that time, the three layers are vulcanized and undetachably bonded to one another. The surface is distinguished by a continuous vulcanization skin which is broken up only with respect to its color by the material of the bottom layer which has been forced into the apertures. A comparable result can be obtained when in place of a polished calender roll a calender roll having a surface with a wafflelike texture, or a corresponding press die, is used.

|  | Percent | |
|---|---|---|
|  | A | I |
| SB rubber | 15 | 11.8 |
| High-styrene resin (65% block styrene) | 2.4 | 5.6 |
| Kaolin | 60 | 59 |
| Chalk | 8.5 | 8.2 |
| Plasticizer | 1.7 | 3 |
| TiO$_2$ | 3.5 | — |
| Iron-oxide red | — | 2.5 |
| Lithopone | 6.7 | 6.7 |
| ZnO | 0.7 | 0.7 |
| Stearic acid | 0.35 | 0.35 |
| Triethanolamine | 0.35 | 0.35 |
| Paraffin | 0.35 | 0.35 |
| Anti-ageing agent | 0.2 | 0.2 |
| 2-Mercaptobenzothiazole | 0.2 | 0.2 |
| Dibenzothiazyl disulfide | 0.2 | 0.2 |
| Sulfur | 0.85 | 0.85 |
|  | 100 | 100 |

Figures are percent, based on total weight of mixture.

EXAMPLE 2

A comparison sample of the sheet made from mixture I is perforated as described in Example 1 and laid on the top surface of the prevulcanized sheet made from mixture A. The rest of the procedure is as described in Example 1. Because of the differences in the viscosity at 170° C., no clean surfaces are obtained, that is to say, mixture A, which has poorer flow properties, does not fill the apertures punched in the top layer, and the contours of the apertures are not sharply defined.

EXAMPLE 3

In a sample according to Example 1, the top layer is replaced with an appropriately perforated woven fabric made from polyester fibers. The latter, of a thickness of 2.4 mm, has a weight of 350 g/m$^2$ and is provided on its back with a layer of a resorcinol-formaldehyde latex for the purpose of closing the pores and assuring good adhesion to the rubber-elastic material of the middle layer. The other layers, their arrangement relative to each other, and the conditions under which they are all pressed together are as described in Example 1. Because of its fabric surface areas, the floor covering so obtained is distinguished by an attractive appearance and good thermal insulation and footfall absorption. It stands up well under shopping-cart traffic and easily withstands high static and dynamic loads.

It will be understood that the specification and examples are illustrative but not limitative of the present invention and that other embodiments within the spirit and scope of the invention will suggest themselves to those skilled in the art.

What is claimed is:

1. A method of making a floor covering, comprising:
   providing a bottom layer comprised of an unvulcanized rubber sheet material;
   providing a top layer comprised of a prevulcanized rubber material having a higher pressure-flow viscosity than the bottom layer;
   forming a mosaic of small circular apertures through the top layer in a desired pattern of size, shape, and distribution; and
   thereafter only pressing and vulcanizing the top and bottom layers together for bonding them together into the floor covering and substantially only filling the apertures of the top layer with the less-viscous bottom layer material;
   whereby, when the top and bottom layers are different colors, a colored mosaic pattern corresponding to the apertures is produced.

2. The method of claim 1 wherein forming the mosaic of small apertures comprises one of punching, cutting, and drilling.

3. The method of claim 1 further comprising distributing between the layers particles of a polymeric material having a different color than at least one of the layers prior to pressing.

4. The method of claim 1 wherein forming the mosaic of small apertures comprises forming generally uniformly distributed apertures of from about 1 mm to about 5 mm across the same spacing and forming therebetween a pattern of other apertures having at least one of a different size and spacing.

5. The method of claim 1 wherein forming the mosaic of small apertures comprises forming the same with boundaries perpendicular to a surface of the top layer.

6. The method of claim 1 wherein the materials of the top and bottom layers form a pressure-vulcanized skin, and wherein pressing the top and bottom layers together also forms a uniform pressure-vulcanized skin over the outside of the top layer and the bottom layer material filling the apertures thereof.

7. The method of claim 1 wherein the thickness of the bottom layer is at least equal to that of the top layer.

8. The method of claim 1, wherein the material of the top layer consists essentially of prevulcanized rubber and the material of the bottom layer consists essentially of unvulcanized rubber, whereby to provide the top layer with the higher pressure-flow viscosity than the bottom layer; and
   further comprising vulcanizing the rubbers of the top and bottom layers during the pressing of the top and bottom layers together.

* * * * *

UNITED STATES PATENT AND TRADEMARK OFFICE
CERTIFICATE OF CORRECTION

PATENT NO. : 5,049,431
DATED : September 17, 1991
INVENTOR(S) : Klaus Heckel et al It is certified that error appears in the above-identified patent and that said Letters Patent is hereby corrected as shown below:

Column 4, lines 37 and 47, "interval" should read --internal--.

Signed and Sealed this

Seventeenth Day of August, 1993

Attest:

BRUCE LEHMAN

Attesting Officer

Commissioner of Patents and Trademarks